United States Patent [19]

Jochem et al.

[11] 4,385,916
[45] May 31, 1983

[54] METHOD OF PRODUCING AN OPTICAL FIBER HAVING A CORE WHICH HAS A NONCIRCULAR CROSS-SECTION, AND DOUBLE CRUCIBLE FOR USE IN THIS METHOD

[75] Inventors: Cornelis M. G. Jochem; Petrus J. W. Severin, both of Eindhoven, Netherlands

[73] Assignee: U.S. Philips Corporation, New York, N.Y.

[21] Appl. No.: 293,719

[22] Filed: Aug. 17, 1981

[30] Foreign Application Priority Data

Aug. 30, 1980 [NL] Netherlands .................... 8004960

[51] Int. Cl.³ .......................................... C03B 37/075
[52] U.S. Cl. ...................... 65/3.13; 65/126; 65/145
[58] Field of Search ................ 65/3.13, 3.11, 3.2, 65/121, 126, 145; 350/96.3

[56] References Cited

U.S. PATENT DOCUMENTS

| 4,106,847 | 8/1978 | Arnaud | 350/96.3 |
| 4,307,938 | 12/1981 | Dyott | 350/96.3 |

FOREIGN PATENT DOCUMENTS

| 55-105208 | 8/1980 | Japan | 65/3.13 |
| 55-108602 | 8/1980 | Japan | 65/3.13 |
| 2012983 | 8/1979 | United Kingdom . | |

*Primary Examiner*—Richard V. Fisher
*Attorney, Agent, or Firm*—Marc D. Schechter

[57] ABSTRACT

An optical fiber having a circular outer cross-section and having a core which has a noncircular cross-section is produced by using a double crucible. The outer crucible is provided with a ring-shaped channel of which at least one of the boundary walls has a noncircular cross-section. The glass of the outer crucible is passed through this channel before it is contacted with the glass of the inner crucible.

8 Claims, 9 Drawing Figures

METHOD OF PRODUCING AN OPTICAL FIBER HAVING A CORE WHICH HAS A NONCIRCULAR CROSS-SECTION, AND DOUBLE CRUCIBLE FOR USE IN THIS METHOD

BACKGROUND OF THE INVENTION

The invention relates to a method of producing an optical fiber, having a core which has a noncircular cross-section, by using a double crucible. In the double crucible, the outflow opening of the inner crucible is wholly within the space enclosed by the outer crucible.

Optical fibers of this nature can be used when it is necessary to suppress coupling between modes having different polarization directions. This is desirable when the pulse dispersion in a monomode fiber is reduced by compensation of material dispersion to such an extent that the chromatic dispersion amounts to some picosecs/km. nm. In order to maintain this level, it is desirable that the fiber propagates a polarized signal. Decoupling can be optimized if the fibers having the desired geometry are in a noncircular stress condition. (UK patent application No. GB 20 12 983).

Fibers of the type described above may be used as monomode telecommunication fibers. They may also be used as sensors, for example, in the measurement of a magnetic field, or more generally may be used in devices for measuring physical effects which produce mechanical stress in optical fibers.

The invention also relates to a double crucible suitable for manufacturing optical fibers having cores with noncircular cross-sections. The double crucible includes an inner crucible for the core glass material and an outer crucible for the cladding glass.

Optical fibers consisting of a light-conducting core having a noncircular, for example elliptical, cross-section are known per se. In these known fibers, the cladding directly contacts the core, and the shape of the cross-section of the fiber corresponds in general with the cross-section of the core. A fiber having a core which has an elliptical cross-section may itself have an elliptical cross-section (see, for example, U.S. Pat. No. 4,106,847).

SUMMARY OF THE INVENTION

It is an object of the invention to provide a double crucible method of producing an optical fiber of circular cross-section having a core which has a noncircular cross-section.

It is a further object of the invention to provide a double crucible suitable for producing an optical fiber having a circular cross-section with a core having a noncircular cross-section.

It has been found that an optical fiber of the above-described structure can be obtained by a method in which the glass in the outer crucible (that is to say the cladding glass) passes through a channel surrounding the discharge end of the inner crucible before it contacts the glass flowing from the inner crucible (the core glass). The channel is bounded by at least one noncircular cylindrical wall.

One of the noncircular cylindrical boundary walls may have, for example, an elliptical cross-section.

Preferably, before it comes into contact with the core glass, the cladding glass is passed through a channel comprising an interior boundary wall which has a noncircular, for example an elliptical, cross-section.

With the double crucible used according to the invention, the outer crucible has an outflow opening which has a circular outer cross-section. On drawing the outflowing glass into a fiber, a fiber having a circular cross-section with a core having a noncircular cross-section is obtained.

The degree to which the cross-section of the core deviates from a circle is determined inter alia by the shape and dimension of the restriction which the cladding glass experiences in the channel surrounding the discharge end of the inner crucible and by the distance over which the core glass flows in contact with the cladding glass through the space enclosed by the outer crucible. The shorter this distance, the more the cross-section of the core will deviate from a circle for a given geometry of the channel. It is also important to choose the glass compositions such that the surface tension at the interface between the glasses is as low as possible.

The method of the invention offers practical advantages compared with a method in which the outflow opening of the inner crucible is not circular, for example, elliptical. The method can be carried into effect with crucibles of a customary shape and dimensions, that is to say having outflow apertures of circular cross-sections. The desired geometry can be obtained by means of inserts. The effect of the method is, however, increased if the outflow opening of the inner crucible is also noncircular. For example, when the outflow opening is elliptical, the fiber core is also given an elliptical cross-section.

The method of the invention furnishes the additional advantage that the inner and the outer crucibles may both have circular cross-sections. The glass flow in the outer crucible can be limited by means of simple inserts.

The crucibles and inserts may be produced of quartz or platinum.

DESCRIPTION OF THE PREFERRED EMBODIMENTS

Figure 1:
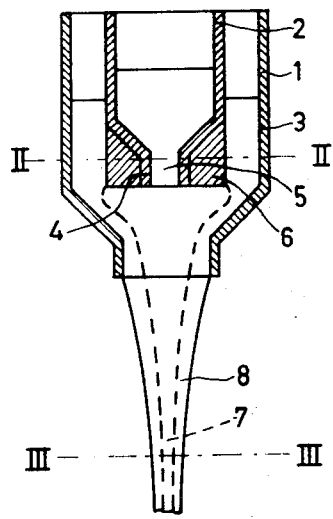
FIG. 1 is a partly schematic and partly cross-sectional view of a double crucible according to the invention.

The double crucible for fabricating optical fibers as shown in FIG. 1 comprises an outer crucible 1 and an inner crucible 2. The outflow opening of inner crucible 2 is wholly within the space enclosed by the outer crucible 1.

Figure 2:
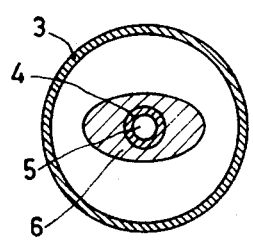
FIG. 2 is a cross-sectional view along line II—II of FIG. 1.

FIG. 2 shows a cross-section in the plane of line II—II of FIG. 1. The cross-sectional view shows the circular wall 3 of the outer crucible 1 and the circular wall 4 of the outflow channel 5 of the inner crucible 2. An insert 6 having an elliptical cross-section is provided around the outflow opening 5 in the space enclosed by the outer crucible 1. Thus, there is formed a ring-shaped channel having an inner boundary wall with an elliptical cross-section.

It appears that the extent to which the glass fiber core is of the same shape as the cross-section of the insert 6 depends on the distance between the outflow opening 5 of the inner crucible 2 and the point at which the glass flows out from the outer crucible 1. The shorter this distance, the smaller the influence any difference in surface tension between the glasses will have on the shape of the core.

Figure 3A:
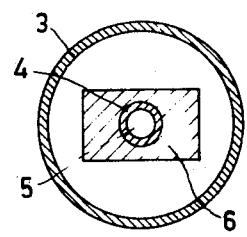
FIG. 3A is a cross-sectional view of a channel having a rectangular inner wall.
Figure 3:
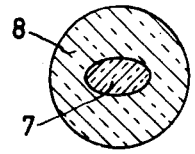
FIG. 3 is a cross-sectional view along line III—III of FIG. 1.

FIG. 3 is a cross-sectional view on line III—III through an optical fiber with a core 7 and cladding 8. The fiber is produced by the apparatus shown in FIG. 1.

It is not necessary according to the invention for the geometry of the ring-shaped channel to be elliptical. Alternatively, the inner wall may have a rectangular shape (see the cross-section shown in FIG. 3A) or any other desired shape. The degree to which the cross-section of the core in the optical fiber is of the same shape as the restriction depends in the first instance on the distance over which the core glass flows in contact with the cladding glass through the space enclosed by the outer crucible.

Figure 4:
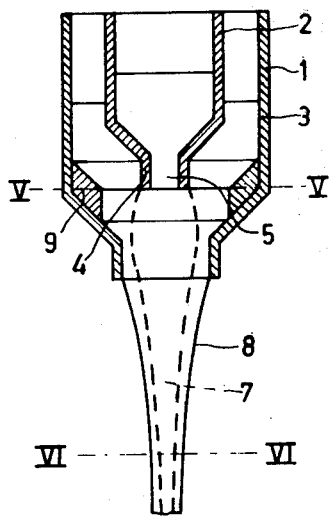
FIG. 4, is a partly schematic and partly cross-sectional view of another double crucible according to the invention.
Figure 5:
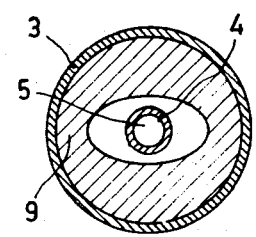
FIG. 5 is a cross-sectional view along line V—V of FIG. 4.
Figure 6:
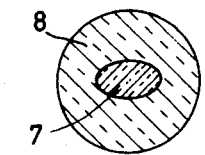
FIG. 6 is a cross-sectional view along line VI—VI of FIG. 4.
Figure 8:
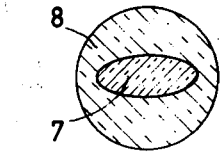
FIG. 8 is a cross-sectional view of an optical fiber produced using the double crucible shown in FIG. 1 or the double crucible shown in FIG. 7.

FIG. 4 shows a further embodiment of a crucible according to the invention. The reference numerals in FIG. 4 correspond to those in the preceding Figures. In FIG. 4, an insert 9 is provided in the outer crucible 1. This insert has an interior boundary wall of an elliptical cross-section (see FIG. 5). FIG. 6 shows a cross-section of the fiber produced by this apparatus.

The method according to the invention may be carried out with glasses having compositions as shown in the following Table 1. The differences in surface tension in this core/cladding pair is substantially zero.

TABLE 1

| (Glass compositions in mole %, and index of refraction) | | |
| --- | --- | --- |
|  | core | cladding |
| $SiO_2$ | 44.5 | 45 |
| $B_2O_3$ | 35 | 35 |
| $Nb_2O_5$ | 0.5 | — |
| $Na_2O$ | 20 | 20 |
| $n_d$ | 1.5260 | 1.5213 |

Figure 7:
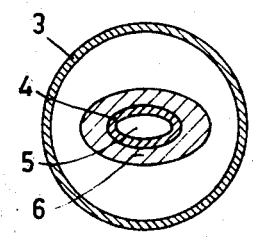
FIG. 7 is a cross-sectional view of through a shaping channel of another double crucible.

A fiber having a circular cross-section 175 μm in diameter and a core having a strip-shaped cross-section (length 31 μm, width 1.4 μm) can be produced as follows. The glasses described in Table 1 were obtained by fusing at 1300° C. the oxides in the indicated molar ratio. All precursors were added in the form of their oxides except $Na_2O$ which was added in a molecularly equivalent quantity as sodium carbonate. The fiber was produced using a double crucible in which the outflow opening of the inner crucible had a cross-section as shown in FIG. 7. The fibers were drawn at a temperature of 1050° C.

The present invention relates only to a method and apparatus for obtaining the desired geometry. A noncircularly symmetrical stress condition can be realized by choosing the composition of the core and cladding glasses such that the cladding glass has the lower coefficient of thermal expansion. At the fiber the cladding is then subjected to a compressive stress. The influence of different oxides on the coefficient of expansion of glass is extensively described in the literature (see inter alia H. Schloze, Glas, Natur Struktur und Eigenschaften 1977 2nd edition pages 142–151).

What is claimed is:

1. A method of manufacturing an optical fiber having a core with a noncircular cross-section, said method comprising the steps of:
    flowing a cladding glass material through a first channel, said first channel having an annular shape, said cladding glass itself forming a channel when it flows out of the first channel;
    flowing a core glass material through a second channel, an end of the second channel being surrounded by the first channel; and
    flowing the core glass out of the end of the second channel into the channel formed in the cladding glass;
    characterized in that:
    the first channel has a noncircular wall; and
    the method further comprises the steps of:
    flowing the core and cladding glasses together through a third channel having a substantially circular cross-section; and
    flowing the core and cladding glasses into contact with each other.

2. A method as claimed in claim 1, characterized in that the noncircular wall of the first channel has an elliptical cross-section.

3. A method as claimed in claim 2, characterized in that the second channel has a noncircular cross-section.

4. A method as claimed in claim 1, characterized in that the first channel has an outer wall and inner wall, and the noncircular wall of the first channel is the inner wall.

5. A method as claimed in claim 4, characterized in that the second channel has a noncircular cross-section.

6. A double-crucible apparatus for manufacturing an optical fiber having a circular cross-section, said optical fiber having a core with a noncircular cross-section, said apparatus comprising:
    an outer crucible having a wall defining at least part of a first channel, said first channel having an annular shape; and
    an inner crucible having a wall defining a second channel, said second channel having an end which is surrounded by the first channel;
    characterized in that:
    at least one wall of the first channel is noncircular; and
    the outer crucible has a wall defining a third channel, said third channel having a substantially circular cross-section, said first and second channels opening into the third channel.

7. An apparatus as claimed in claim 6, characterized in that the end of the second channel has a noncircular cross-section.

8. An apparatus as claimed in claim 7, characterized in that the end of the second channel has an elliptical cross-section.

* * * * *